No. 747,088. PATENTED DEC. 15, 1903.
A. E. SAXTON.
STRAINER.
APPLICATION FILED APR. 24, 1903.
NO MODEL.

Witnesses
Charles Morgan
Harry Ellis Chandlee

Inventor
A. E. SAXTON.
By Chandlee & Chandlee
Attorneys.

No. 747,088. Patented December 15, 1903.

UNITED STATES PATENT OFFICE.

ABIGAIL E. SAXTON, OF POMONA, MICHIGAN.

STRAINER.

SPECIFICATION forming part of Letters Patent No. 747,088, dated December 15, 1903.

Application filed April 24, 1903. Serial No. 154,070. (No model.)

*To all whom it may concern:*

Be it known that I, ABIGAIL E. SAXTON, a citizen of the United States, residing at Pomona, in the county of Manistee, State of Michigan, have invented certain new and useful Improvements in Strainers; and I do hereby declare the following to be a full, clear, and exact description of the invention, such as will enable others skilled in the art to which it appertains to make and use the same.

This invention relates to strainers or sifters; and it has for its object to provide a construction comprising a receptacle for the material to be treated having a screen at its bottom and an agitator thereabove, the receptacle being designed for use in connection with a vessel which may be hung therefrom or which may support the receptacle and at the same time receive the material that passes through the screen.

Figure 1:
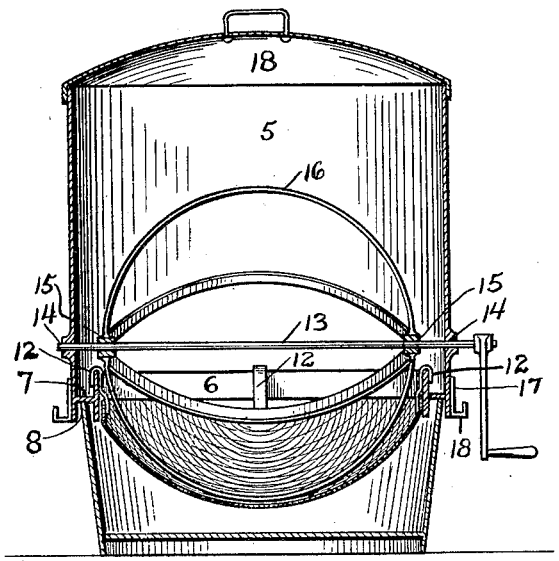
Figure 2:
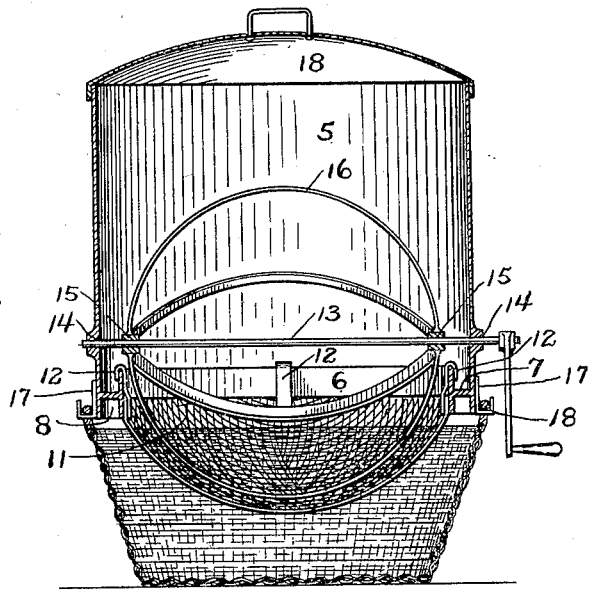

In the drawings forming a portion of this specification, and in which like numerals of reference indicate similar parts in both views, Figure 1 is a vertical section showing the receptacle engaged with the top of a bucket. Fig. 2 is a view similar to Fig. 1 and showing a basket hung from the receptacle.

Referring now to the drawings, the present device or utensil includes a cylindrical body portion or receptacle 5, within the lower end of which and concentric therewith is a cylindrical drum 6, which is connected to the body portion 5 by means of the web 7 at a point between the ends of the drum and above the lower end of the receptacle, so that there is an annular chamber 8 between the walls of the drum and receptacle which is designed to receive the upper edge portion of a bucket 9 when the receptacle 5 is disposed for passage of its contents to the bucket.

Within the lower portion of the receptacle 5 and within the drum 6 is disposed the circular frame 10 of a hemispherical screen 11, the frame fitting removably in the upper end of the drum and having hooks 12, which engage over the upper end of the drum, so that the screen-frame will be prevented from sinking or sliding downwardly through the drum.

In connection with the screen is employed an agitator consisting of a crank-shaft 13, mounted removably in bearings 14 at the sides of the receptacle 5 and on which are the hubs 15, to which are connected the ends of semicircular arms or strikers 16, so arranged that as the crank-shaft is rotated the arms will be carried downwardly and then upwardly along the inner face of the screen and through any material that may be within the screen, so that such material will be agitated and urged through the screen. When it is desired to disassemble the parts for any reason, the crank-shaft may be withdrawn and the arms removed and then the screen with its frame.

At times it is desired to discharge through the screen to a basket, and in order that the basket may be hung from the receptacle or body portion 5 the vertical straps 17 are secured to the body portion, or receptacle and have hooks 18 at their lower ends, which hooks are passed into and engaged with the inner surface of the basket or through the side walls of the basket.

A cover 18 is provided for the receptacle.

It will be understood that in practice the present utensil may be used for any purpose to which it is adapted, that modifications may be made, and that any suitable material and proportions may be used for the various parts without departing from the spirit of the invention.

What is claimed is—

A sifter comprising a receptacle, a hollow cylindrical member mounted in the lower end of the receptacle and spaced therefrom, an annular web connecting the cylindrical member and receptacle, said web being attached to the cylindrical member at a point midway between the edges thereof, thus forming an upper topless compartment and a lower bottomless compartment between the cylindrical member and the receptacle, a hemispherical screen having a frame surrounding the upper edge thereof and adapted to fit within the cylindrical member said frame being provided with hooks for engagement over the upper edge of the cylindrical member, the lower bottomless compartment being adapted to receive the edge of a vessel to prevent the passage of the material to be sifted between the vessel and the lower edge of the receptacle.

In testimony whereof I affix my signature in presence of two witnesses.

ABIGAIL E. SAXTON.

Witnesses:
L. L. DUFFY,
WILLIAM G. ADAMS.